Feb. 18, 1947. P. B. CAMP 2,416,251
BRAKE OPERATING MECHANISM
Filed May 29, 1943 3 Sheets-Sheet 1
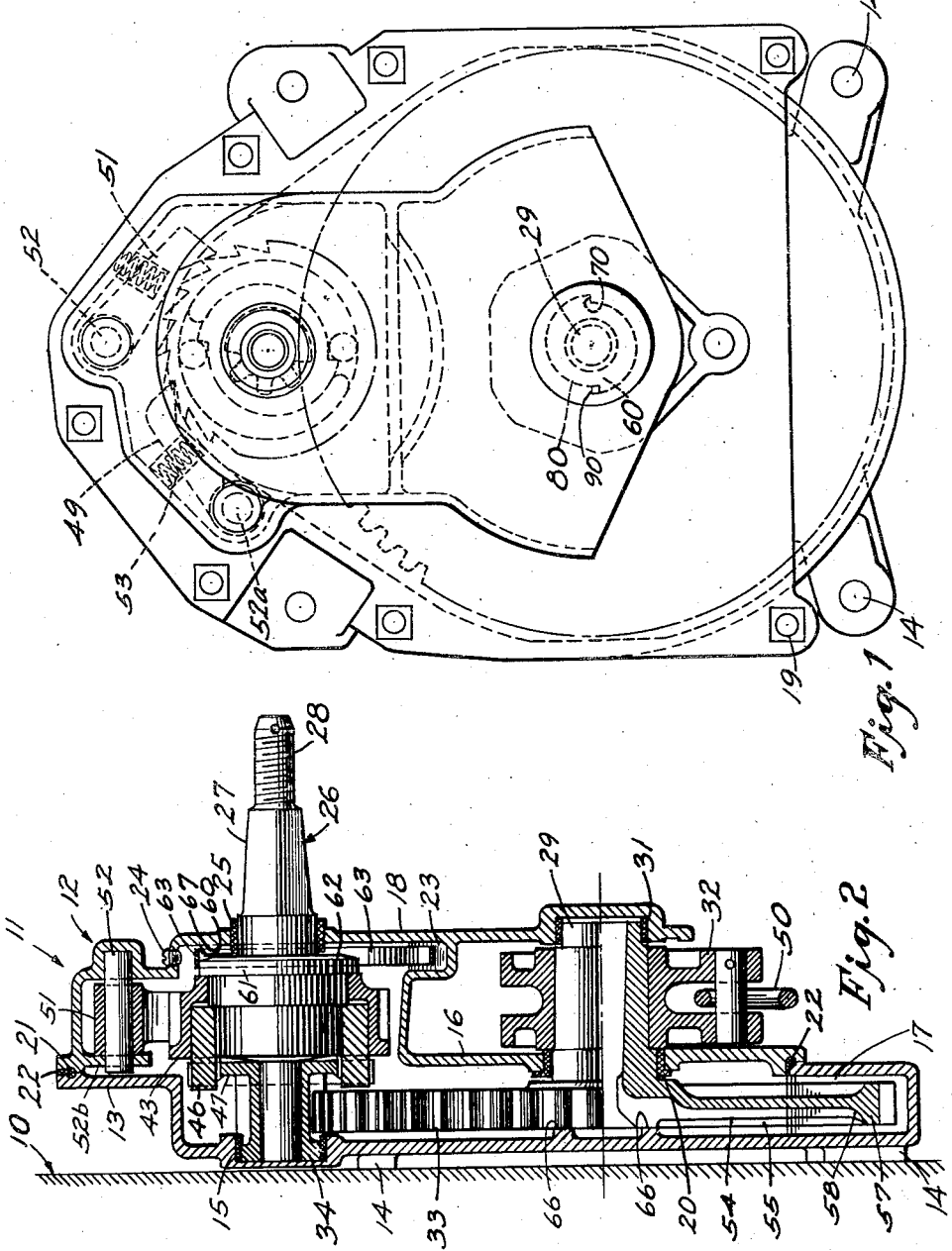
INVENTOR.
Percy B. Camp
BY Mann, Brown &Co
attys

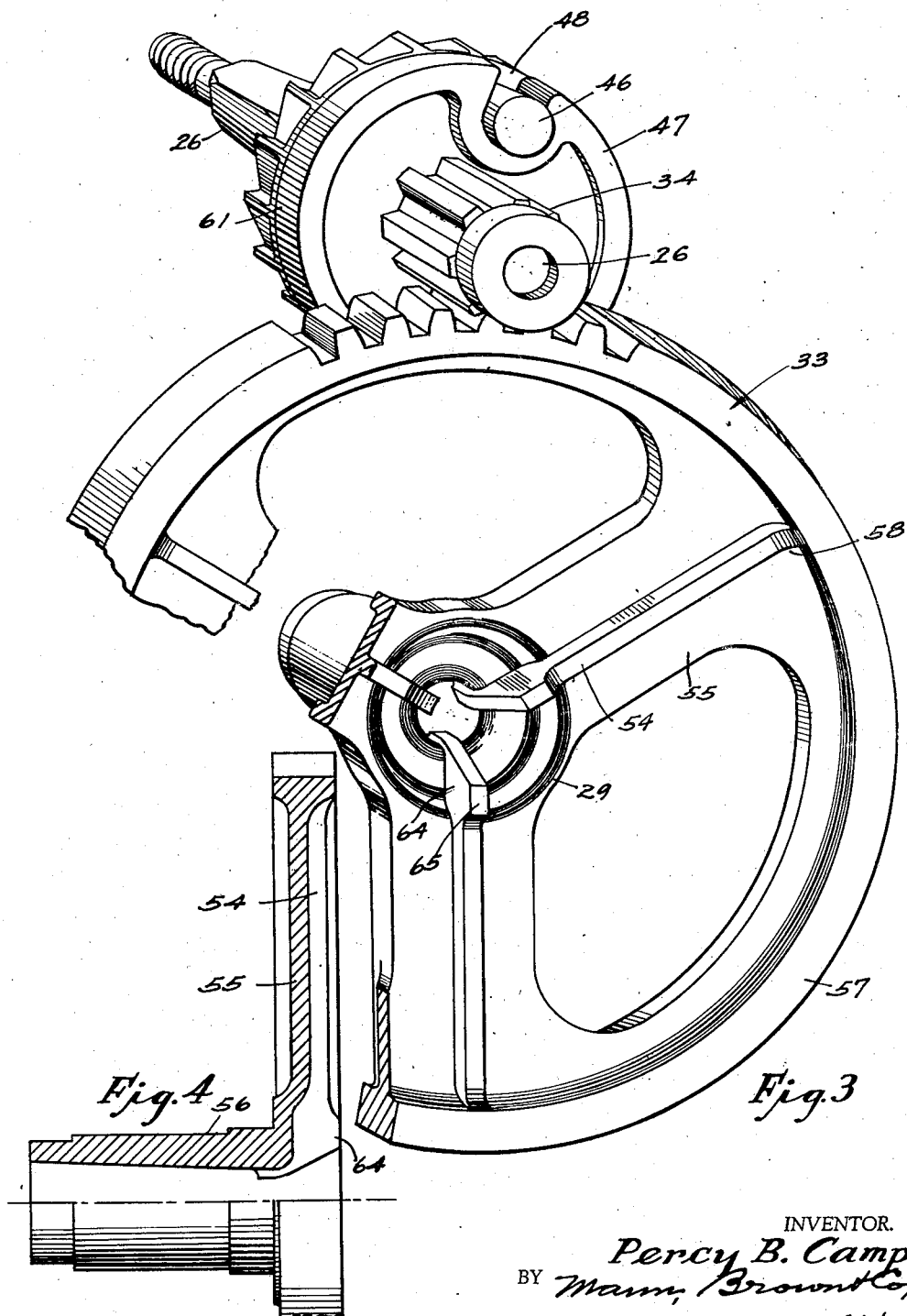

Feb. 18, 1947.  P. B. CAMP  2,416,251
BRAKE OPERATING MECHANISM
Filed May 29, 1943  3 Sheets-Sheet 3
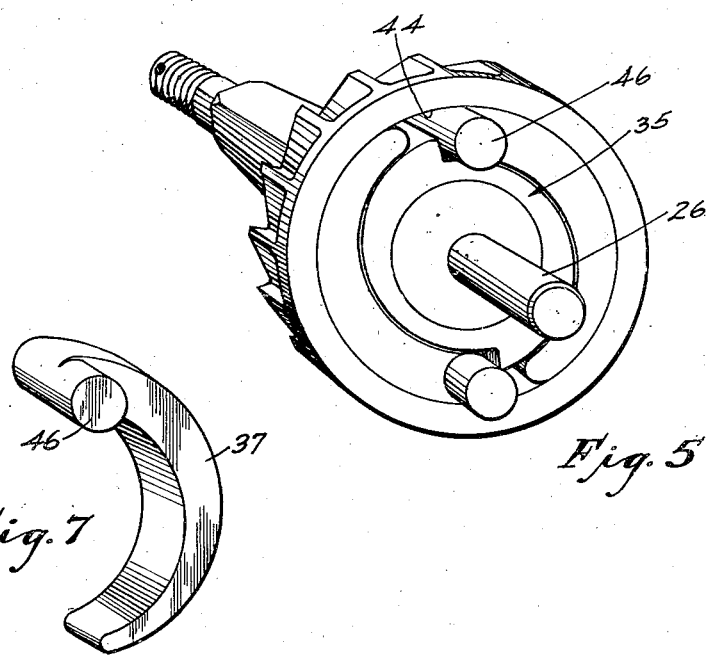
Fig. 5
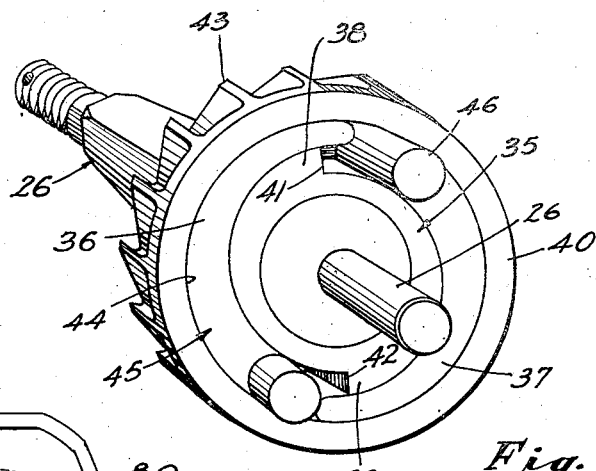
Fig. 7
Fig. 6
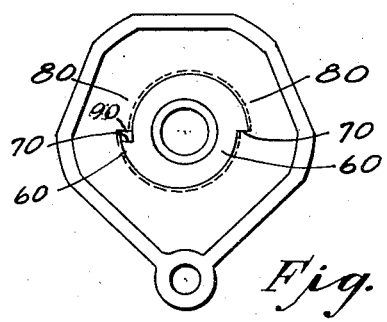
Fig. 8
INVENTOR.
Percy B. Camp
BY Maun, Brown &
attys Patented Feb. 18, 1947

2,416,251

UNITED STATES PATENT OFFICE 2,416,251

BRAKE OPERATING MECHANISM

Percy B. Camp, Maywood, Ill., assignor to Universal Railway Devices Company, a corporation of Delaware Application May 29, 1943, Serial No. 488,983

7 Claims. (Cl. 74—505)

1

This invention relates to brakes for railway cars, and more particularly to the type of brake that is manually operated.

One of the objects of the invention is the provision of new and improved brake operating mechanism in which the release of the brake is automatically accomplished by reverse movement of the brake wheel.

Another object of the invention is the provision of a new and improved brake operating mechanism that is so constructed that the operating parts are greatly simplified and materially reduced in number.

A further object of the invention is the provision of a new and improved brake operating mechanism that requires merely the turning of the wheel in winding direction for applying the brakes and reverse movement for releasing the winding mechanism.

Another object of the invention is the provision of a brake operating mechanism in which the release of the brake is accomplished by an intermittent reverse movement of the brake wheel for releasing the winding mechanism.

A further object of the invention is the provision of a new and improved brake operating mechanism for railway cars having novel means for automatically oiling the journals of the operating mechanism.

A still further object of the invention is the provision of a new and improved brake mechanism that is simple in construction, composed of few moving parts, inexpensive to manufacture, and automatic in clutching and declutching the brake shaft to the brake pinion by initial rotation of said shaft.

Other and further objects and advantages of the invention will appear from the following description taken in connection with the accompanying drawings in which Fig. 1 is a front elevation of the brake, with the brake wheel removed;

Fig. 2 is a section on the line 2—2 of Fig. 1;

Fig. 3 is an enlarged view, with parts in section and parts broken away, of a portion of the brake operating mechanism;

Fig. 4 is a section on the line 4—4 of Fig. 3;

Fig. 5 is a perspective view of a portion of the brake operating and clutch mechanism, showing the clutch in release position;

Fig. 6 is a similar view, showing the clutch in applied position; and

Fig. 7 is a perspective view of one of the clutch shoes; and

2

Fig. 8 is a front elevation of a portion of the casing, with parts broken away.

It is highly desirable, in railway brakes, that the brake operating mechanism be so constructed that it will not be necessary for the brakeman to release either hand from the brake wheel during either the application or release of the brakes, and in view of severe weather conditions in certain portions of the country in winter, as where mixed rain and sleet are not uncommon, it is also desirable that the mechanism for releasing the brakes be of the simplest type, requiring the manual movement of a minimum number of exposed moving parts.

In the present invention the brake operating mechanism, except the brake wheel and a portion of the brake shaft, are protected from rain, snow and ice by a housing or casing, and the parts are so constructed that the brake wheel is the sole member to be manipulated by the hands of the operator in applying the brakes, or in releasing the same. The clutching and declutching of the operating mechanism is done automatically during the initial turning of the brake wheel.

Referring now to the drawings, the reference character 10 designates an end of a railway car, to which is applied the brake operating mechanism 11. This mechanism comprises a brake housing 12, having an inner section 13 and an outer section 18 providing a partition at its lower portion. The inner section 13 is rigidly connected to the end of the railway car in any suitable manner, as by bolts or rivets engaging the brackets 14. The section 13 of the housing is provided with a brake shaft bearing 15, and at its lower portion it is provided, in any suitable manner, with an oil recess or reservoir 17, as shown more clearly in Fig. 2 of the drawing. The outer section 18 of the housing is secured to the inner section 13 in any suitable manner, as by means of bolts 19, which rigidly hold the parts together. The meeting edges of the two sections of the housing may be provided with a groove or recess 21, extending about the edge of the housing, and this groove is adapted to contain a gasket 22 for rendering the casing oil-proof.

The outer section 18 of the casing is provided with an oil recess or reservoir 23, which is formed in any suitable manner, as by a partition 16 which extends upwardly from the outer portion of the section 18, then inwardly, and then downwardly between the inner and outer walls of the housing 12. This reservoir is adapted to contain oil for lubricating certain of the parts, as will presently appear. The casing is provided with an opening 24 through which oil may be introduced into the reservoir 23, and when this reservoir is filled it will run over into the reservoir 17 for assisting in lubricating other parts of the mechanism, as will be hereinafter described.

Journaled in the upper portion of the housing, and engaging the bearing 15 on the inner section and a bearing 25 on the outer section, is the brake shaft 26. It will be noted that the bearing 15 does not extend through the inner section of the casing, but the shaft 26 extends outwardly through the section 18. The shaft 26 is provided with a tapered end 27, angular in cross-section, on which the brake wheel is adapted to be secured, as by means of a nut or the like, on the reduced threaded end 28 of the shaft, as is usual in such constructions.

Rotatably mounted in the lower portion of the housing is the hub 29 of a brake drum gear 33 which forms the brake drum shaft, and which is journaled at its inner end in a bearing 20 in the partition 16, and at its outer end it is reduced to form a journal that engages in a bearing 31 in the outer section of the casing 18. The brake drum 32 is connected to the hub 29 in any suitable manner, and turns therewith. The connection between the brake drum 32 and the brake drum shaft or hub 29 is such as to require no keys or gibs, and hence dispenses with the expense of machining ways for the same.

As shown, the intermediate portion of the hub 29 has a plurality of radially extending eccentric or cam projections 60, forming shoulders 70, at opposite sides of the hub. The peripheries of these projections are inclined and engage corresponding openings through the drum, having cooperating inclined eccentric surfaces 80, forming shoulders 90, on its walls opposite the shoulders 70, whereby when the gear 33 is turned in the direction to apply the brakes a wedging or locking connection is obtained between the drum and this gear hub, and when turned in the opposite direction the cooperating shoulders engage to rotate the drum reversely. This arrangement will automatically take up all wear between the parts, since there is always a wedging action between these surfaces in applying the brakes.

Rigidly mounted on the inner end of the shaft 29 is a brake drum gear 33, which is adapted to engage a pinion 34 rotatably mounted on the inner end of the shaft 26, as shown in Fig. 2 of the drawing. The brake shaft 26 is adapted to be clutched to the pinion 34 by an eccentric clutch mechanism that will now be described.

Rigidly mounted on the shaft 26 (Figs. 6 and 7), as by being integral and rotatable therewith, is a clutch operating cam member 35, which is adapted to engage a plurality of clutch or friction shoes 36, 37 (two being shown). The cam member 35 is enlarged radially opposite the shoes, as shown at 38, 39, Figs. 5 and 6. In other words, in the form shown the periphery of the cam member 35 has inclined or wedge faces spaced 180° apart. The enlargements 38, 39, of the cam member 35 are provided with radial walls or shoulders 41, 42, which are opposite each other and are opposite the inner portions of the cam members. Rotatably mounted on the shaft 26 is a ratchet wheel 43, having a drum member 40 provided with an interior friction drum surface 44, which is concentric with the shaft 26 and is adapted to be engaged by the outer surfaces of the clutch or friction shoes 36, 37.

The shoes 36, 37, are curved, and are wedge-shaped or tapered, and on the thicker end each has an outwardly extending driving lug 46 which is preferably, though not necessarily, circular in cross-section. These lugs 46 are arranged opposite each other, and each operates in the space defined by the walls 41, 42, between the inner surface of the drum member 44 and the peripheral surface of the cam member 35, respectively. The thin portion of the shoes engage the thick portion of the cam members 38, 39, and are so arranged that when the shaft 26 is moved in the direction to apply the brakes the cam members 38, 39, will wedge the shoes 36, 37, against the inner periphery of the drum member to cause the ratchet wheel 43 to rotate with the shaft 26.

The pinion 34, Fig. 3, is rotatably mounted on the shaft 26, and is rigidly connected to or integral with a clutch operating disc member 47, which in turn is keyed to the shoes 45 in any suitable manner. As shown, the disc member 47 is provided with peripheral recesses 48 within which the driving lugs 46 are adapted to seat.

It will thus be seen that in the operation of the device, when the brake shaft 26 is rotated clockwise the cam clutch operating members 38, 39, will cam the shoes 36, 37, outwardly against the inner periphery 44 of the ratchet drum member 40 on the ratchet wheel 43. This clutching arrangement causes the ratchet wheel 43, and with it the entire clutch mechanism, to rotate with the shaft 26, thus rotating the pinion 34, and this pinion will rotate the brake drum gear 33, and with it the drum 32, for winding up the brake chain 50 for applying the brake in the usual manner.

A plurality of pawls 49 and 51, Fig. 1, are employed for preventing the backward rotation of the shaft 26, whether the brake is being applied or being released, and for holding the brakes set in holding position. These pawls are mounted on pivots 52, 52a, Figs. 1 and 2, which are mounted in the outer section of the casing, as shown in these figures of the drawing. The inner ends of these pivots are journaled in a partition 52b integral with the section 18 of the housing, Fig. 2. Each of the pawls is provided with a spring 53 for holding the same against the teeth of the ratchet. The pawls are so arranged that when one of them is in holding position the other is out of holding position, so that the ratchet will be held at all times against reverse movement. When it is desired to release the brake all that is necessary is to initially rotate the hand wheel in the reverse direction, and this movement will release the cam members of the clutch mechanism and permit the brake drum to freely rotate in reverse direction independently of the brake shaft, for a partial reverse rotation of the drum and disc member 47. Further reverse rotative movement of the disc 47, without further reverse rotation of the shaft 26, will cause a wedging action of the wedge shoes 36 and 37, thus preventing further release of the brake until the hand wheel and brake shaft 26 are further reversely rotated. It will thus be seen that the brakes are released by an intermittent reverse movement of the hand wheel or brake shaft 26.

The described arrangement may be considered as comprising a railway brake mechanism, an actuating means and clutch means for operatively connecting the actuating means with the mechanism. In such an analysis, the brake mechanism includes the brake drum 32 carrying the chain 50, the shaft or hub 29 on which the brake drum is mounted, the brake drum gear 33 and the pinion 34. The actuating means is represented by the brake shaft 26. The clutch means includes the cam member 35 as an inner clutch member with an outwardly presented clutch surface and the drum member 40 as an outer clutch member with an inwardly presented clutch surface. The two clutch surfaces form a tapered space for each clutch shoe 37 and obviously either or both of the clutch surfaces may be eccentric to provide such taper. While in the preferred embodiment of the invention shown in the drawings the actuating means is connected to the inner clutch member and a ratchet means is employed to block reverse rotation of the outer clutch member, it is conceivable that in some practices of the invention the actuating means may be directly connected to the outer clutch member and the ratchet means employed to prevent reverse rotation of the inner clutch member.

Suitable means are provided for automatically oiling the journaled parts of the operating mechanism. In the form of construction shown, the reservoirs 17 and 23 are supplied with oil at intervals of time, as required, and means are provided for transferring this oil to the bearings. The bearings for the drum shaft 29 are lubricated in a manner that will now be described. The brake gear 33 extends down into the reservoir 17, and this gear is provided on its inner side with a plurality of radially extending ribs 54, Fig. 3, extending laterally inwardly from the spokes 55. The ends of each of these ribs adjacent the hub 29 has a projection 64, flattened, as at 65, Figs. 1 and 3, and these projections are adapted to engage a circular abutment member 66, integral with the inner section of the housing 13, for limiting the inward movement of the drum. The abutting portions of the projections and abutment member are flattened to give a broad bearing surface, as shown in Fig. 1.

These ribs 54 extend at their inner ends into the inner end of the hub 56 of the gear 33, which has an axial opening with its walls inclined toward the outer end of the hub. At their outer ends these ribs connect with the rim 57 of the gear and are flush therewith. This forms what may be termed a pocket 58 for collecting oil as the gear rotates through the reservoir 17, and when the rib 54 turns to the inclined position shown at the left in Fig. 3 the oil collected will run downwardly along the rib 54 into the inner end of the hub 56 and along the inclined walls of the opening in the hub to the outer bearing 31 of the gear. The inner bearing 20 of the hub 56 will be supplied with oil that adheres to the outer side of the gear 55 and runs down the spoke into the end of the bearing. Oil adhering to the teeth of the gear 33 will be carried to the teeth of the pinion 34 for oiling the bearing 15, and will also oil the teeth of the pinion.

Suitable means are provided for oiling the bearing 25 of the brake shaft 26. As shown, a collar 62 on the shaft 26 has a circular peripheral face 61 on which is mounted an oil ring 63, which dips into the oil in the reservoir 23, and the rotation of the shaft 26 will rotate the oil ring 63 for carrying oil to the upper portion of the bearing 25 for lubricating the same. The oil ring 63 is wider than the face 61 of the collar 62, and its outer edge extends over and engages a segmental flange or rib 67 on the outer section of the housing 18 and which curves over the shaft 26 as a center. The outer face of the collar 62 may be inclined inwardly toward its circumference, so as to form a V-shaped space 60 for conducting oil from the oil ring down into the bearing 25 for lubricating the same.

It will thus be seen that the principal operating parts of the brake are housed in a weatherproof casing; that the operating parts are lubricated; and that the clutch mechanism is automatic in its operation, whereby upon release the brake drum rotates independently of the brake shaft a limited distance and then the wedge or cam mechanism locks the drum from further turning until the brake wheel and shaft are again initially rotated for again releasing the clutch mechanism. Thus the brake may be released step by step without the necessity of releasing pawls or other holding means except the cam mechanism, which is operated automatically by the reverse turning of the brake wheel and shaft.

By means of this arrangement both hands of the operator are free for manipulating the brake wheel for both applying and for releasing the brakes. This is considered an important feature of the invention, since the operator can concentrate on the operation of the brake wheel alone and is not required to hold the wheel with one hand while releasing pawls or turning levers with the other, as is required in the conventional construction when releasing or adjusting the brakes.

It is thought from the foregoing, taken in connection with the accompanying drawings, that the operation and construction of my device will be apparent to those skilled in the art, and that changes in size, shape, proportion and details may be made without departing from the spirit and scope of the appended claims.

I claim as my invention:

1. In means for controlling a railway brake mechanism, an inner clutch member having an outwardly presented clutch surface, an outer clutch member having an inwardly presented clutch surface, at least one of said two surfaces being at least in part eccentric whereby the two surfaces form at least one space tapering in the rotary direction of brake release, one of said clutch members being adapted for actuation to energize said mechanism, means to block rotation of the other clutch member in brake-releasing direction, and a clutch shoe in said space to retractibly wedge between said two surfaces thereby to interconnect the two clutch members and to rotate therewith, said clutch shoe being connected with said mechanism for operation thereof.

2. In means for controlling a railway brake mechanism, a combination as set forth in claim 1 in which said clutch shoe is tapered in accord with the tapering configuration of said space.

3. In means for controlling a railway brake mechanism, an inner clutch member having an outwardly presented clutch surface, an outer clutch surface having an inwardly presented clutch surface, at least one of said two surfaces having a plurality of eccentric portions whereby the two surfaces form a plurality of spaces tapering in the rotary direction of brake release, said plurality of spaces being equally distributed circumferentially, one of said clutch members being adapted for actuation to energize said mechanism, means to block rotation of the other clutch member in brake-releasing direction, and a plurality of clutch shoes corresponding to said plurality of spaces, each clutch shoe extending into the corresponding space to retractibly wedge between said two surfaces thereby to interconnect the two clutch members and at such time to rotate therewith in a unitary manner, said clutch shoes being connected with said mechanism for operation thereof.

4. In means for use in controlling a railway brake mechanism by a brake-actuating means, an inner clutch member for connection with said actuating means, said inner member having an outwardly presented clutch surface, an outer clutch member having an inwardly presented clutch surface, at least one of said surfaces being at least in part eccentric whereby the two surfaces form at least one space tapering in one direction of rotation, means to block rotation of said outer clutch member in the opposite direction and at least one clutch shoe in said space to retractibly wedge between said two surfaces thereby to interconnect the two clutch members and to rotate therewith, said clutch shoe being connected with said mechanism for operation thereof.

5. In means for use in controlling a brake mechanism by a brake-actuating means, an inner clutch member for connection with said actuating means, said inner member having an outwardly presented clutch surface, an outer clutch member surrounding said inner clutch member, said outer clutch member having an inwardly presented clutch surface, at least one of said surfaces having a plurality of eccentric portions whereby the two surfaces form a plurality of spaces tapering in one direction of rotation, means to block rotation of said outer clutch member in the opposite direction, and a plurality of clutch shoes corresponding to said plurality of spaces, each clutch shoe extending into the corresponding space to retractibly wedge between said two surfaces thereby to interconnect the two clutch members and at such time to rotate therewith in a unitary manner, said clutch shoes being connected with said mechanism for operation thereof.

6. In means for use in controlling a railway brake mechanism by a brake-actuating means, an inner clutch member for connection with said actuating means, said inner clutch member having an outwardly presented clutch surface, said outer clutch surface having a plurality of eccentric portions equally distributed circumferentially, an outer clutch member surrounding said inner clutch member, said outer clutch member having an inwardly presented cylindrical surface whereby said two surfaces form a plurality of spaces tapering in one direction of rotation, ratchet means to block rotation of said outer clutch member in the opposite direction of rotation, and a plurality of clutch shoes corresponding to said plurality of spaces, each clutch shoe extending into the corresponding space to retractibly wedge between said two surfaces thereby to interconnect the two clutch members and at such time to rotate therewith in a unitary manner, said clutch shoes being connected with said mechanism for operation thereof.

7. In means for releasably connecting a brake-actuating shaft to a railway brake mechanism, an inner clutch member fixedly mounted on said shaft, said inner clutch member having an outwardly presented clutch surface, an outer clutch member surrounding said inner clutch member, said outer clutch member having an inwardly presented clutch surface, at least one of said two surfaces being at least in part eccentric whereby the two surfaces form at least one space tapering in the rotary direction of brake release, means to block rotation of said outer clutch member in the direction of brake release, at least one clutch shoe in said space to retractibly wedge between said two surfaces thereby to interconnect the two clutch members and at such time to rotate therewith, and means rotatable about the axis of said shaft, said rotatable means being operatively connected with said mechanism for actuation thereof and being operatively connected with said shoe for actuation thereby.

PERCY B. CAMP.

REFERENCES CITED

The following references are of record in the file of this patent:

UNITED STATES PATENTS

| Number | Name | Date |
|---|---|---|
| 2,268,228 | Van Cleave | Dec. 30, 1941 |
| 2,299,402 | Mersereau | Oct. 20, 1942 |
| 2,310,135 | Van Cleave | Feb. 2, 1943 |
| 2,313,602 | Van Cleave | Mar. 9, 1943 |
| 2,053,419 | Brecht | Sept. 8, 1936 |
| 1,755,841 | Sandstrom | Apr. 22, 1930 |
| 2,265,376 | Klasing | Dec. 9, 1941 |
| 2,189,978 | Dyke | Feb. 13, 1940 |
| 654,620 | Garver | July 31, 1900 |

FOREIGN PATENTS

| Number | Country | Date |
|---|---|---|
| 454,273 | Germany | Jan. 4, 1928 |